(12) United States Patent
Gu et al.

(10) Patent No.: US 12,733,025 B2
(45) Date of Patent: Sep. 8, 2026

(54) DATA SENDING METHOD, APPARATUS, AND DEVICE

(71) Applicant: HUAWEI TECHNOLOGIES CO., LTD., Shenzhen (CN)

(72) Inventors: Yu Gu, Shanghai (CN); Chao Zhang, Shanghai (CN); Juncai Shi, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 308 days.

(21) Appl. No.: 18/604,447

(22) Filed: Mar. 13, 2024

(65) Prior Publication Data

US 2024/0224313 A1 Jul. 4, 2024

Related U.S. Application Data

(63) Continuation of application No. PCT/CN2022/119795, filed on Sep. 20, 2022.

(30) Foreign Application Priority Data

Sep. 27, 2021 (CN) .......................... 202111138630.1

(51) Int. Cl.
*H04W 72/53* (2023.01)
*H04W 72/044* (2023.01)

(52) U.S. Cl.
CPC ......... *H04W 72/53* (2023.01); *H04W 72/044* (2013.01)

(58) Field of Classification Search
CPC ............................ H04W 72/53; H04W 72/044
See application file for complete search history.

(56) References Cited

U.S. PATENT DOCUMENTS

2014/0233391 A1* 8/2014 Reider .................. H04W 72/20 370/236
2018/0109994 A1* 4/2018 Lee ....................... H04W 48/12

FOREIGN PATENT DOCUMENTS

EP 3346756 A1 * 7/2018 ............ H04W 72/23
JP 2013192188 A 9/2013

* cited by examiner

*Primary Examiner* — Mohammad S Anwar

(57) ABSTRACT

The present disclosure provides a data sending method and apparatus. The method may include: determining one or more second sending policies of one or more users at a target transmission time interval (TTI) based on data amount and one or more first sending policies of the one or more users, so that a second sending policy of a first user is different from a first sending policy of the first user. In addition, second energy consumption corresponding to the one or more second sending policies is less than first energy consumption corresponding to the one or more first sending policies, an occupied second time-frequency resource under the one or more second sending policies is greater than an occupied first time-frequency resource under the one or more first sending policies, and the second time-frequency resource is less than an available time-frequency resource provided by a base station at the target TTI.

17 Claims, 5 Drawing Sheets

Obtain downlink data used to be sent at a target TTI — 401

Determine a second sending policy of one or more users at the target TTI based on an amount of the downlink data and a first sending policy of the one or more users — 402

Send the downlink data at the target TTI through a downlink channel corresponding to the second sending policy of the one or more users — 403

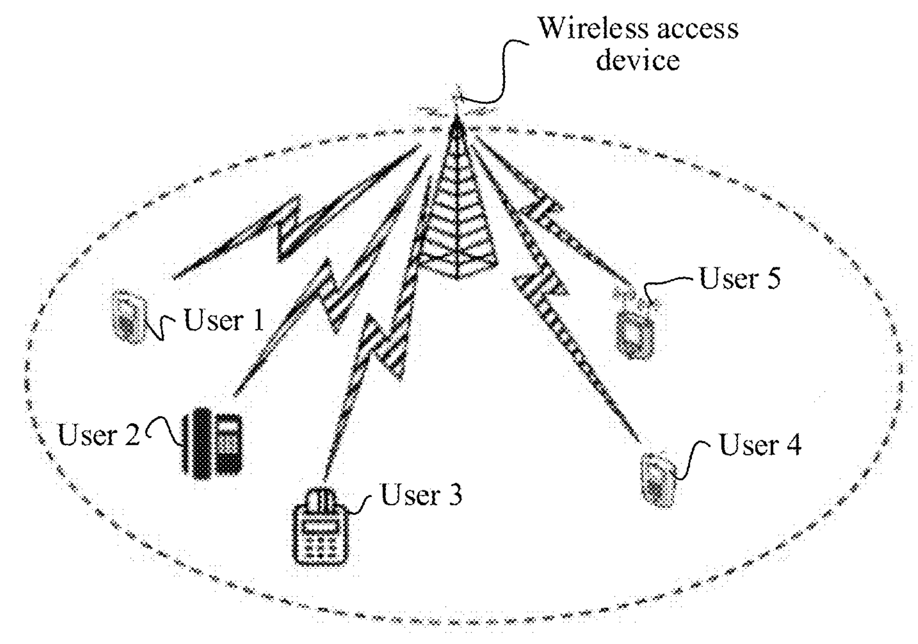
FIG. 1
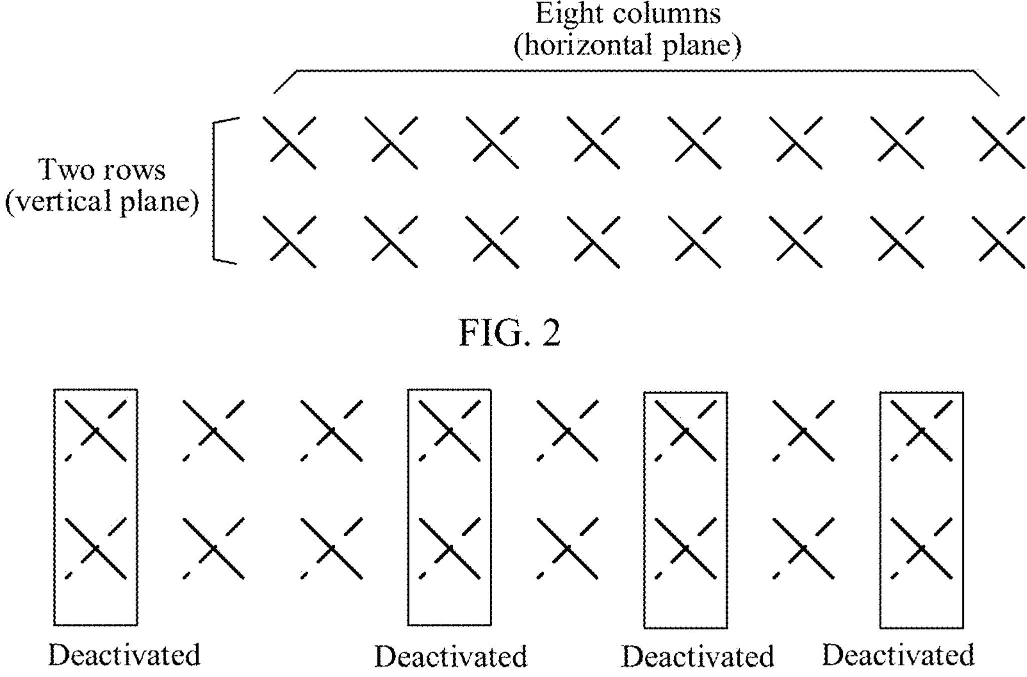
FIG. 2
FIG. 3

DATA SENDING METHOD, APPARATUS, AND DEVICE

CROSS-REFERENCE TO RELATED APPLICATIONS

This application is a continuation of International Application No. PCT/CN2022/119795, filed on Sep. 20, 2022, which claims priority to Chinese Patent Application No. 202111138630.1, filed on Sep. 27, 2021. The disclosures of the aforementioned applications are hereby incorporated by reference in their entireties.

TECHNICAL FIELD

This application relates to the field of communication technologies, and in particular, to a data sending method, an apparatus, and a device.

BACKGROUND

With continuous improvement of a requirement on a communication rate, a quantity of antennas of a base station increases. A massive multiple-input multiple-output (multiple-input multiple-output, MIMO) technology has become a core technology of 4th generation mobile communication and 5th generation mobile communication. As the quantity of antennas of the base station increases, energy consumption corresponding to the antennas of the base station also increases continuously. Therefore, how to reduce the energy consumption when a user-perceived rate is lossless becomes a problem that needs to be urgently resolved currently.

SUMMARY

Embodiments of this application provide a data sending method, an apparatus, and a device, to reduce energy consumption when a user-perceived rate is lossless.

To resolve the foregoing technical problem, embodiments of this application provide the following technical solutions.

According to a first aspect, an embodiment of this application provides a data sending method. The method may be applied to a wireless access device, where the wireless access device may be, for example, a base station in a 4th generation mobile communication technology or a 5th generation mobile communication technology. The wireless access device may include one or more antennas. For example, the antenna may be an antenna using a massive MIMO technology. The one or more antennas include an antenna for data transmission. In this embodiment of this application, the antenna for data transmission is referred to as an antenna. The antenna can provide a time-frequency resource, and send data to a user in a cell by using the time-frequency resource.

The data sending method may include: obtaining downlink data to be sent at a target TTI, where the downlink data includes target data to be sent to each user in one or more users in the cell. For example, the downlink data includes target data of a user 1, target data of a user 2, . . . , and target data of a user n, where n is any positive integer. Target data of a user i is data that is in the downlink data and that corresponds to the user i. Therefore, target data that is in the downlink data and that corresponds to different users is not limited to be the same. Then, a target sending policy of the one or more users at the target TTI is determined according to a current sending policy of the one or more users, where a target sending policy of at least one user (referred to as a target user) in the one or more users is different from a current sending policy of the at least one user. In addition, target energy consumption is less than current energy consumption, and a target time-frequency resource is greater than a current time-frequency resource and is less than an available time-frequency resource provided by the antenna at the target TTI. The target time-frequency resource and the target energy consumption are respectively a time-frequency resource that is consumed and energy consumption that is caused when the wireless access device sends the downlink data according to the target sending policy of the one or more users, and the current time-frequency resource and the current energy consumption are respectively a time-frequency resource that is consumed and energy consumption that is caused when the wireless access device sends the downlink data according to the target sending policy of the one or more users. When the target TTI arrives, the downlink data is sent at the target TTI according to the target sending policy of the one or more users. For example, the target data of the user 1 is sent to the user 1 according to a target sending policy of the user 1, the target data of the user 2 is sent to the user 2 according to a target sending policy of the user 2, . . . , and the target data of the user n is sent to the user n according to a target sending policy of the user n.

In this embodiment of this application, a current sending policy of a target user in to-be-scheduled users is adjusted, to obtain a target sending policy of the target user at a future TTI (that is, the target TTI), so as to reduce energy consumption of sending the downlink data at the target TTI, and help achieve TTI-level energy saving. In addition, a time-frequency resource occupied for sending the downlink data is extended within a limit of the available time-frequency resource, to help reduce impact of an energy saving measure on measurement and demodulation of the downlink data, and ensure that a user-perceived rate is lossless.

Optionally, a second index value of a modulation and demodulation scheme MCS indicated by a second sending policy of the target user is less than a first index value of an MCS indicated by a first sending policy of the target user.

Optionally, a second value that is of a transmission parameter of the antenna and that is indicated by the second sending policy of the target user is less than a first value that is of the transmission parameter and that is indicated by the first sending policy of the target user, where a value of the transmission parameter is positively correlated with energy consumption corresponding to the antenna.

Optionally, the transmission parameter is for determining a transmit power of the antenna and/or a quantity of activated antennas in the antenna.

Optionally, the transmission parameter includes an antenna activating parameter, the antenna activating parameter includes a quantity of activated antenna columns, and/or an activated polarization direction of the antenna, and the antenna activating parameter is for determining the quantity of activated antennas in the antenna.

Optionally, a difference between channel quality (a signal to interference plus noise ratio (Signal to Interference plus Noise Ratio, SINR) is used as an example) corresponding to the second value and a SINR corresponding to the first value is less than or equal to a difference between a second minimum SINR corresponding to the second index value and a first minimum SINR corresponding to the first index value. The second minimum SINR is a minimum SINR that is of the downlink channel and that is required for sending target data of the target user based on the second index value on the premise of ensuring a target code error rate, and the first minimum SINR is a minimum SINR that is of the downlink channel and that is required for sending the target data of the target user based on the first index value on the premise of ensuring the target code error rate.

Optionally, the second index value is determined based on the available time-frequency resource.

Optionally, if a second value of the power is less than a first value of the power, the target user is a non-demodulation reference signal (demodulation reference signal, DMRS) user, and the first index value is greater than 9, the second index value is less than or equal to 9.

According to a second aspect, an embodiment of this application provides a communication apparatus, including an obtaining module, a determining module, and a sending module. The obtaining module is configured to obtain downlink data to be sent at a target transmission time interval TTI, where the downlink data includes target data to be sent to each user in one or more users in a cell. The determining module is configured to determine a second sending policy of the one or more users at the target TTI based on an amount of the downlink data and a first sending policy of the one or more users. A first sending policy and a second sending policy of each user in the one or more users are separately used for controlling a parameter of a downlink channel, and a second sending policy of a target user in the one or more users is different from a first sending policy of the target user, second energy consumption is less than first energy consumption, and a second time-frequency resource is greater than a first time-frequency resource and is less than an available time-frequency resource provided by an antenna at the target TTI. The second time-frequency resource and the second energy consumption are respectively a time-frequency resource that is consumed and energy consumption that is caused when a wireless access device sends the downlink data according to the second sending policy of the one or more users, and the first time-frequency resource and the first energy consumption are respectively a time-frequency resource that is consumed and energy consumption that is caused when the wireless access device sends the downlink data according to the first sending policy of the one or more users. The sending module is configured to send the downlink data at the target TTI through the downlink channel corresponding to the second sending policy of the one or more users.

Optionally, a second index value of a modulation and demodulation scheme MCS indicated by the second sending policy of the target user is less than a first index value of an MCS indicated by the first sending policy of the target user.

Optionally, a second value that is of a transmission parameter of the antenna and that is indicated by the second sending policy of the target user is less than a first value that is of the transmission parameter and that is indicated by the first sending policy of the target user, where a value of the transmission parameter is positively correlated with energy consumption corresponding to the antenna.

Optionally, the transmission parameter is for determining a transmit power of the antenna and/or a quantity of activated antennas in the antenna.

Optionally, the transmission parameter includes an antenna activating parameter, the antenna activating parameter includes a quantity of activated antenna columns, and/or an activated polarization direction of the antenna, and the antenna activating parameter is for determining the quantity of activated antennas in the antenna.

Optionally, a difference between channel quality (a SINR is used as an example) corresponding to the second value and a SINR corresponding to the first value is less than or equal to a difference between a second minimum SINR corresponding to the second index value and a first minimum SINR corresponding to the first index value. The second minimum SINR is a minimum SINR that is of the downlink channel and that is required for sending target data of the target user based on the second index value on the premise of ensuring a target code error rate, and the first minimum SINR is a minimum SINR that is of the downlink channel and that is required for sending the target data of the target user based on the first index value on the premise of ensuring the target code error rate.

Optionally, the second index value is determined based on the available time-frequency resource.

Optionally, if a second value of the power is less than a first value of the power, the target user is a non-DMRS user, and the first index value is greater than 9, the second index value is less than or equal to 9.

According to a third aspect, an embodiment of this application provides a communication apparatus. The communication apparatus includes a processor, configured to implement the method described in the first aspect. The communication apparatus may further include a memory, configured to store instructions and data. The memory is coupled to the processor, and when executing the instructions stored in the memory, the processor can implement the method described in an eighth aspect or a ninth aspect. The communication apparatus may further include a communication interface. The communication interface is used by the apparatus to communicate with another device. For example, the communication interface may be a transceiver, a circuit, a bus, a module, a pin, or another type of communication interface.

According to a fourth aspect, an embodiment of this application provides a chip system.

The chip system may include a processor and may further include a memory, configured to implement the method described in the first aspect. The chip system may include a chip, or may include a chip and another discrete component.

According to a fifth aspect of this application, an embodiment of this application provides a computer-readable storage medium. The computer-readable storage medium includes instructions. When the instructions are run on a computer, the computer is activated to perform the method in any one of the possible implementations of the first aspect in embodiments of this application.

According to a sixth aspect of this application, an embodiment of this application provides a computer program product. The computer program product includes instructions. When the instructions are run on a computer, the computer is activated to perform the method in any one of the possible implementations of the first aspect in embodiments of this application.

According to a seventh aspect, an embodiment of this application provides a communication system. The communication system may include the communication apparatus in the second aspect and user equipment corresponding to a user.

BRIEF DESCRIPTION OF DRAWINGS

FIG. 1 shows an example of a possible schematic diagram of a communication system;

FIG. 2 and FIG. 3 each show an example of a possible schematic diagram of an antenna array;

DESCRIPTION OF EMBODIMENTS

Figure 4:
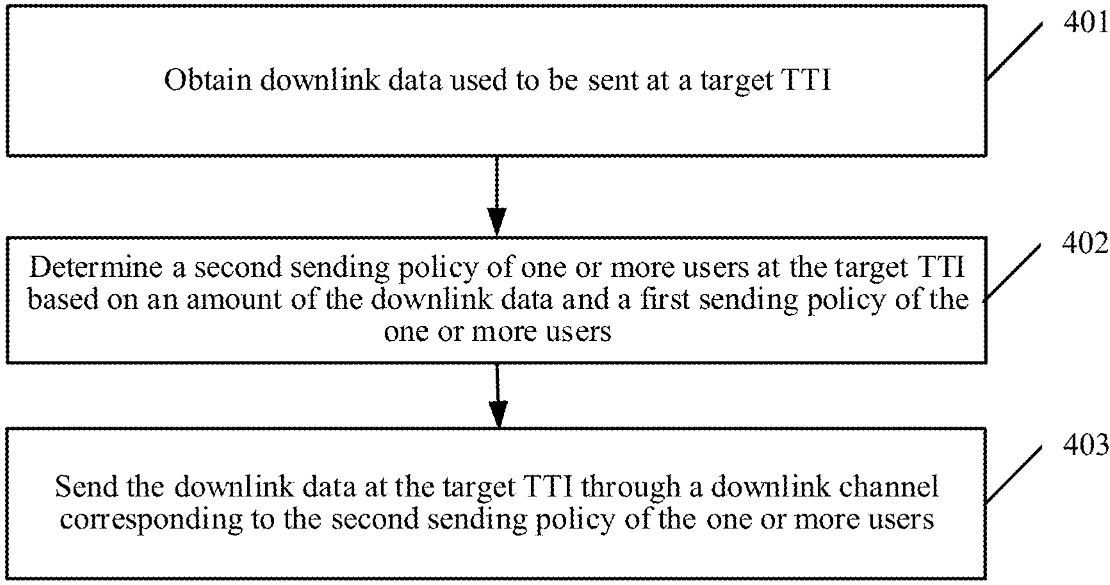
FIG. 4 to FIG. 6 each show an example of a possible flowchart of a method according to an embodiment of this application.

Embodiments of this application provide a data sending method, an apparatus, and a device. The following describes embodiments of this application with reference to the accompanying drawings.

The technical solutions in embodiments of this application may be applied to various wireless communication systems or networks, for example, a long term evolution (long term evolution, LTE) system, an LTE frequency division duplex (frequency division duplex, FDD) system, LTE time division duplex (time division duplex, TDD), a 5th generation (5th generation, 5G) system, a communication system introduced in the future, or convergence of a plurality of systems. 5G may also be referred to as new radio (new radio, NR).

FIG. 1 is a possible schematic diagram of a communication system according to an embodiment of this application. As shown in FIG. 1, the communication system includes a wireless access device and a user 1 to a user 5 in a cell (for example, an area in a dashed-line box shown in FIG. 1) corresponding to the wireless access device. It should be noted that the communication system to which embodiments of this application are applicable may include more or fewer users than those in FIG. 1.

The wireless access device in embodiments of this application may be, for example, an access node and/or another network entity. For example, the wireless access device may be an evolved NodeB or an evolved NodeB (evolved NodeB, eNB or eNodeB) in an LTE system, a base station in a 5G network, or a base station in a future evolved PLMN network. The base station in the 5G network may be referred to as a next generation NodeB (next generation NodeB, gNB). This is not limited in embodiments of this application.

In embodiments of this application, a user may be user equipment or a terminal device that may be a device that has a wireless transceiver function. The device may be deployed on the land, for example, the device is an indoor device, an outdoor device, a handheld device, or a vehicle-mounted device; or the device may be deployed on the water (for example, on a ship); or the device may be deployed in the air (for example, on a plane, a balloon, or a satellite). The terminal device may be user equipment (user equipment, UE). The UE includes a handheld device, a vehicle-mounted device, a wearable device, or a computing device that has a wireless communication function. For example, the UE may be a mobile phone (mobile phone), a tablet, or a computer that has a wireless transceiver function. Alternatively, the terminal device may be a virtual reality (virtual reality, VR) terminal device, an augmented reality (augmented reality, AR) terminal device, a wireless terminal in industrial control, a wireless terminal in self-driving, a wireless terminal in telemedicine, a wireless terminal in a smart grid, a wireless terminal in a smart city (smart city), a wireless terminal in a smart home (smart home), or the like. In embodiments of this application, an apparatus configured to implement a function of a terminal may be a terminal, or may be an apparatus, for example, a chip system, that can support the terminal in implementing the function. The apparatus may be mounted in the terminal. In embodiments of this application, the chip system may include a chip, or may include a chip and another discrete component. In the technical solutions provided in embodiments of this application, the technical solutions provided in embodiments of this application are described by using an example in which the apparatus configured to implement the function of the terminal is a terminal and the terminal is UE.

The technical solutions provided in embodiments of this application may be applied to wireless communication between communication devices. The wireless communication between the communication devices may include: wireless communication between a wireless access device and a terminal, wireless communication between wireless access devices, and wireless communication between terminals. In embodiments of this application, the term "wireless communication" may also be briefly referred to as "communication", and the term "communication" may also be described as "data transmission", "information transmission", or "transmission". The technical solutions may be for wireless communication between a scheduling entity (for example, a wireless access device) and a subordinate entity (for example, UE). A person skilled in the art may use the technical solutions provided in embodiments of this application to perform wireless communication between another scheduling entity and another subordinate entity, for example, wireless communication between a macro base station and a micro base station. The scheduling entity may allocate resources to the subordinate entity, and/or the scheduling entity may control wireless communication between the scheduling entity and the subordinate entity.

Information interacted between the user and the wireless access device may be carried by using a physical channel. The wireless access device may provide a downlink channel for a user in a cell through a disposed antenna, and send data to the user by using the provided downlink channel, for example, the information may be carried by using a physical downlink control channel (physical downlink control channel, PDCCH) or a physical downlink shared channel (physical downlink shared channel, PDSCH). An antenna (namely, a receive antenna) configured to receive data may be further disposed on the wireless access device. Because embodiments of this application mainly focus on a process in which the wireless access device sends downlink data, the antenna in embodiments of this application is a transmit antenna configured to send the downlink data to the user.

In a process of sending the data to the user in FIG. 1, the wireless access device may control the sending process by using values of one or more sending parameters. For example, the one or more sending parameters may control a parameter of the corresponding downlink channel, and/or control a modulation mode for sending the data, and/or control a transmission mode for sending the data. In addition, in a process in which the wireless access device sends the data to a plurality of users at a same transmission time interval TTI, values of sending parameters corresponding to different users may be different.

To activate the wireless access device to provide differentiated data sending services for different users, in embodiments of this application, the wireless access device may store sending policies of a plurality of users (for example, the user 1 to the user 5 shown in FIG. 1), and the sending policies indicate the values of the one or more sending parameters. For example, the sending parameter indicated by the sending policy may include but is not limited to at least one of the following parameters: a modulation and coding scheme (modulation and coding scheme, MCS), a rank indication (rank indication, RI), a precoding matrix indication (precoding matrix indication, PMI), a transmission parameter of an antenna, and the like. A smaller transmission parameter of the antenna usually indicates lower energy consumption corresponding to the antenna, or it is considered that a value of the transmission parameter is positively correlated with the energy consumption corresponding to the antenna.

In a possible implementation, the antenna in the wireless access device may be an antenna array. FIG. 2 shows an example of a schematic diagram of the antenna array. Refer to FIG. 2. The antenna array includes two rows and eight columns of antenna units, and each antenna unit includes two orthogonal polarized antennas. Therefore, the antenna array includes 32 antennas. In FIG. 2, a dashed line segment represents an antenna in a first polarization direction, and a solid line segment represents an antenna in a second polarization direction. A specific form of the antenna array is not limited in this embodiment of this application, and FIG. 2 is merely used as a possible example.

Optionally, the transmission parameter of the antenna may be a parameter for determining a transmit power of the antenna and/or a quantity of activated antennas in the antenna. Optionally, the transmission parameter may include an antenna activating parameter. The antenna activating parameter may include but is not limited to a quantity of activated antenna columns and/or an activated polarization direction of the antenna. The wireless access device may control the quantity of activated antennas in the antenna by controlling the antenna activating parameter. A value of the quantity of activated antenna columns may be a quantity of activated antenna columns. As shown in FIG. 3, the value of the quantity of activated antenna columns may be 4. Alternatively, the value of the quantity of activated antenna columns may be a sequence number of the activated antenna columns. As shown in FIG. 3, the value of the quantity of activated antenna columns may be 2, 3, 5, or 7.

The following describes a data sending method provided in embodiments of this application. The method may be applied to a wireless access device or a chip or an apparatus in the wireless access device. The wireless access device is referred to as a base station below.

Refer to FIG. 4. A possible embodiment of the data sending method in this application may include step S401 to step S403.

S401: Obtain downlink data to be sent at a target TTI.

The base station may obtain the downlink data to be sent at the target TTI. The target TTI may be a current TTI, or may be a TTI in the future. The downlink data may be data of a user in a cell, or may include data of a plurality of users in the cell. For ease of description, data of each user in the downlink data is referred to as target data corresponding to the user. It should be noted that target data corresponding to different users may be different. Therefore, it may be understood that the downlink data includes target data to be sent to each user in one or more users in the cell.

S402: Determine a second sending policy of the one or more users at the target TTI based on an amount of the downlink data and a first sending policy of the one or more users.

It is assumed that, before the target TTI arrives, or when the target TTI starts, the base station may store the first sending policy of the one or more users. For an understanding of the first sending policy, refer to the foregoing related descriptions. Details are not described herein again. After obtaining the downlink data corresponding to the target TTI, the base station may determine the second sending policy of the one or more users at the target TTI based on the amount of the downlink data and the first sending policy of the one or more users. That a second sending policy of each user in the one or more users is different from a first sending policy of the user is not limited in this embodiment of this application, provided that a second sending policy of one of the users is different from a first sending policy of the user. A user whose second sending policy is different from a first sending policy is referred to as a target user.

In this embodiment of this application, a time-frequency resource that is consumed and energy consumption that is caused when the base station sends the downlink data according to the first sending policy of the one or more users are respectively referred to as a first time-frequency resource and first energy consumption. A time-frequency resource that is consumed and energy consumption that is caused when the base station sends the downlink data according to the second sending policy of the one or more users are respectively referred to as a second time-frequency resource and second energy consumption. A prerequisite for adjusting a sending policy of the target user from the first sending policy to the second sending policy is that the second energy consumption is less than the first energy consumption, the second time-frequency resource is greater than the first time-frequency resource, and the second time-frequency resource is less than an available time-frequency resource provided by an antenna at the target TTI.

S403: Send the downlink data at the target TTI through a downlink channel corresponding to the second sending policy of the one or more users.

After determining the second sending policy of the one or more users, the base station may send the downlink data at the target TTI through the downlink channel corresponding to the second sending policy of the one or more users. FIG. 1 is used as an example. The base station may send target data of the user 1 to the user 1 through a downlink channel corresponding to a second sending policy of the user 1, send target data of the user 2 to the user 2 through a downlink channel corresponding to a second sending policy of the user 2, . . . , and send target data of the user 5 to the user 5 through a downlink channel corresponding to a second sending policy of the user 5.

In this embodiment of this application, a first sending policy of a target user in to-be-scheduled users is adjusted, to obtain a second sending policy of the target user at the target TTI, so as to reduce energy consumption of sending the downlink data at the target TTI, and help achieve TTI-level energy saving. In addition, a time-frequency resource occupied for sending the downlink data is extended within a limit of the available time-frequency resource, to help reduce impact of an energy saving measure on measurement and demodulation of the downlink data, and ensure that a user-perceived rate is lossless.

In a possible implementation, if all available time-frequency resources of the base station at the target TTI are occupied when the downlink data is sent through a downlink channel corresponding to the first sending policy, the base station may not perform step S402, and send the downlink data at the target TTI through the downlink channel corresponding to the first sending policy.

It is proposed in this embodiment of this application that, based on the first sending policy, the base station may attempt to adjust the first sending policy for the downlink data to be sent at the target TTI, to reduce the energy consumption of the base station at the target TTI on the premise of ensuring that the downlink data can be completely sent at the target TTI and has a low code error rate.

However, because a sending policy of a user involves a large quantity of parameters, adjustment of each parameter may affect a code error rate of data transmission, an occupied time-frequency resource, and the energy consumption of the base station to some extent. The time-frequency resource may be, for example, a quantity of resource blocks (resource blocks, RBs).

How to efficiently obtain the second sending policy of the target user is a focus of the following descriptions.

In a possible implementation, a value (referred to as a second value) that is of a transmission parameter of the antenna and that is indicated by the second sending policy of the target user is less than a value (referred to as a first value) that is of the transmission parameter and that is indicated by the first sending policy of the target user. A smaller transmission parameter of the antenna usually indicates lower energy consumption corresponding to the antenna. Therefore, a value that is of the transmission parameter and that corresponds to the target user is reduced to help reduce the energy consumption of sending the downlink data by the base station at the target TTI.

In a possible implementation, a second index value of a modulation and demodulation scheme MCS indicated by the second sending policy of the target user is less than a first index value of an MCS indicated by the first sending policy of the target user. According to experimental analysis, for a code error rate, a smaller index value of an MCS indicates a lower requirement on channel quality. The channel quality may include, for example, a signal to interference plus noise ratio (signal to interference plus noise ratio, SINR). The following uses the SINR to represent the channel quality. A decrease in the value of the transmission parameter usually causes a decrease in the SINR. Therefore, to ensure a low code error rate (referred to as a target code error rate), it is proposed in this embodiment of this application that a requirement of the target code error rate on the SINR is reduced by decreasing the index value of the MCS. In this way, although the decrease in the value of the transmission parameter may cause the decrease in the SINR, the requirement of the target code error rate on the SINR is reduced by decreasing the index value of the MCS. This helps ensure that a code error rate of sending the downlink data through the downlink channel corresponding to the second sending policy is not less than the target code error rate.

Optionally, the target code error rate may be determined based on a service level of a user, or may be fixed, or may be a corresponding code error rate of sending the downlink data according to the first sending policy.

To further ensure that the code error rate is not reduced after a sending policy of the target user is adjusted, an SINR corresponding to the first value of the transmission parameter and an SINR corresponding to the second value of the transmission parameter may be separately determined, and a minimum SINR (referred to as a second minimum SINR) corresponding to the second index value of the MCS and a minimum SINR (referred to as a first SINR) corresponding to the first index value may be separately determined. The second minimum SINR is a minimum SINR that is of the downlink channel and that is required for sending target data of the target user based on the second index value on the premise of ensuring the target code error rate, and the first minimum SINR is a minimum SINR that is of the downlink channel and that is required for sending the target data of the target user based on the first index value on the premise of ensuring the target code error rate.

Then, the value of the MCS and the value of the transmission parameter may be adjusted when a following constraint condition 1 is met. The constraint condition 1 may include: a difference between the SINR corresponding to the second value and the SINR corresponding to the first value is less than or equal to a difference between the second minimum SINR corresponding to the second index value and the first minimum SINR corresponding to the first index value.

Alternatively, optionally, the second value of the transmission parameter may be first determined, and then the second index value of the MCS is determined based on the first index value of the MCS, the first value and the second value of the transmission parameter, and the constraint condition 1. Optionally, a maximum value that is of the second index value of the MCS and that meets the constraint condition 1 may be selected as the second index value. Optionally, the second value of the transmission parameter may be, for example, an intermediate frequency reporting capability of the antenna. For example, the intermediate frequency reporting capability may be, for example, a maximum attenuation coefficient that can be borne by a power amplifier of the antenna.

Optionally, a candidate value of the second index value of the MCS may be first determined, and then the second value of the transmission parameter is determined based on the first index value of the MCS, the candidate value of the second index value of the MCS, the first value of the transmission parameter, and the constraint condition 1. Optionally, a maximum value that is of the second value of the transmission parameter and that meets the constraint condition 1 may be selected as the second value.

The following describes an optional manner of determining the candidate value of the second index value of the MCS.

Optionally, the second index value may be determined based on the available time-frequency resource of the base station at the target TTI. When the index value of the MCS decreases, more time-frequency resources are occupied for sending a same amount of data. Therefore, to decrease, as much as possible on the premise that the downlink data can be completely sent at the target TTI, a minimum SINR required by the target code error rate, the second index value may be determined based on the available time-frequency resource of the base station at the target TTI, and the MCS is reduced as much as possible by fully using the available time-frequency resource.

Optionally, if a second value of a transmit power is less than a first value of a transmit power, that is, a value of the transmit power in the sending policy of the target user is reduced, and if the target user is a non-DMRS user, and the first index value of the MCS is greater than 9, the second index value needs to be less than or equal to 9 to ensure that the target data of the target user can have a low code error rate.

It is found through an experimental study that, when the index value of the MCS is less than 5, a benefit brought by a decrease in the minimum SINR by continuing to reduce the index value of the MCS is far less than costs increasing when a time-frequency resource is occupied. Therefore, optionally, the second index value may be not less than 5.

Because the available time-frequency resource of the base station at the target TTI is limited, when the one or more users include a plurality of users, a resource for reducing the transmission parameter by reducing the MCS may not be provided for each user by using the available time-frequency resource. Therefore, this application further provides a manner of sorting the plurality of users, so that the base station sequentially adjusts sending policies of the users based on a sequence determined in the sorting manner, until the available time-frequency resource is fully used. For example, a sequence obtained by sorting the user 1 to the user 5 in FIG. 1 in the sorting manner is as follows from front to back: the user 1, the user 2, the user 3, the user 4, and the user 5. The base station attempts to sequentially adjust the sending policies of the users, and verifies whether a prerequisite described in step S402 is met after adjustment. If the prerequisite is met, an adjusted sending policy is used as a second sending policy of the user. If the prerequisite is not met, the sending policy before the adjustment is used as the second sending policy of the user. If there is still a remaining available time-frequency resource after sending policies of the user 1, the user 2, and the user 3 are adjusted, but the downlink data cannot be completely sent after a sending policy of the user 4 is adjusted, it is considered that the available time-frequency resource at the target TTI can be fully used by adjusting the sending policies of the user 1, the user 2, and the user 3 respectively.

Optionally, the base station may set a higher priority for the non-DMRS user and/or a user with a larger first index value of the MCS.

The following describes a possible implementation of step S402 in the method in this embodiment of this application by separately using an example in which a transmission parameter is a transmit power, an example in which the transmission parameter is a quantity of activated antenna columns, and an example in which the transmission parameter is an activated polarization direction of the antenna. It should be noted that one or more of the following possible implementation 1, possible implementation 2, and possible implementation 3 may be performed in step S402.

1. Possible Implementation 1: The Transmission Parameter is the Transmit Power.

Process A: Attempt to adjust a sending policy for a non-DMRS user whose MCS is greater than 9 in the one or more users.

Figure 5:
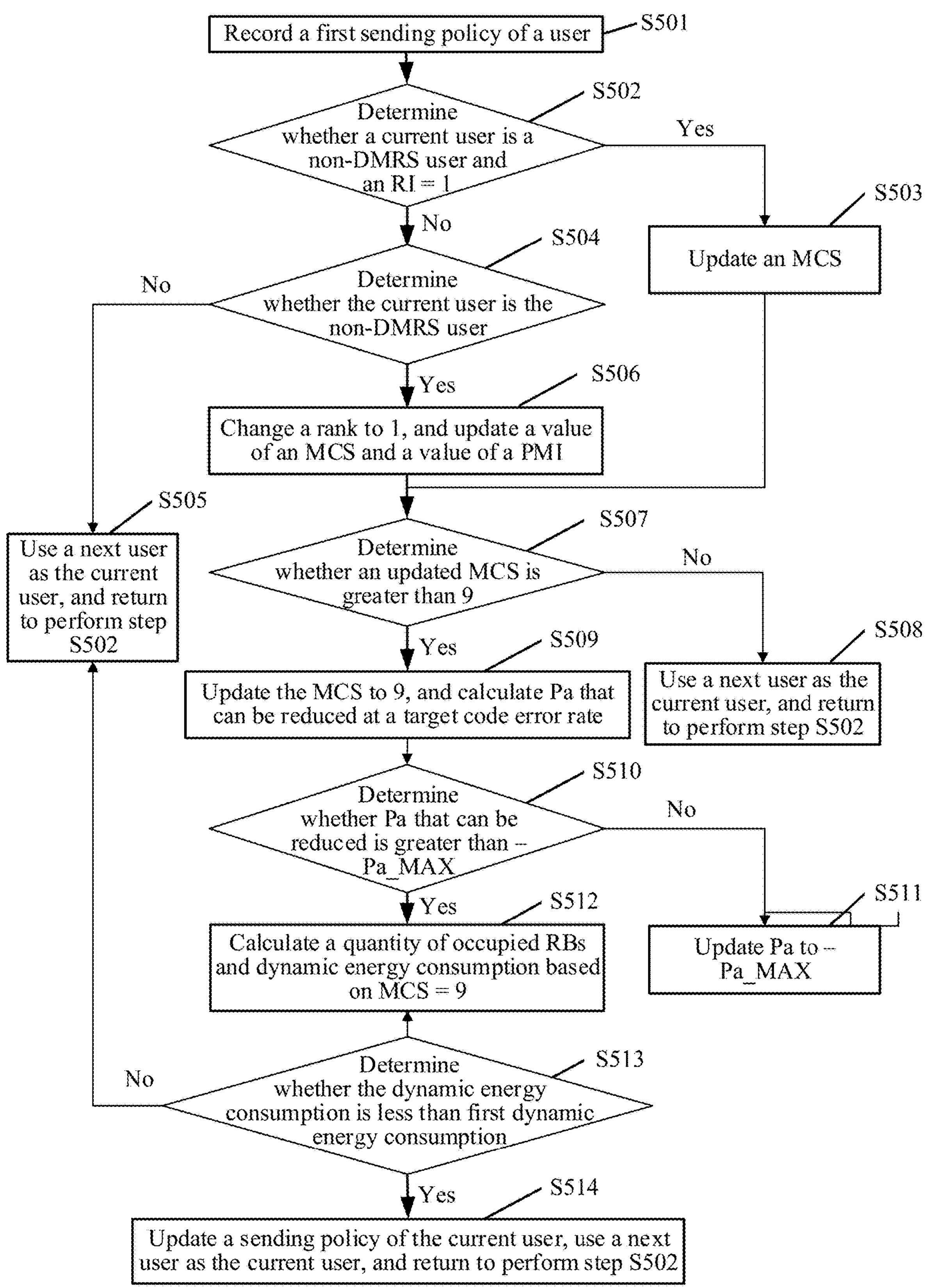

Specifically, refer to FIG. 5. Step S402 may include step 501 to step 514.

S501: Record a first sending policy of a user.

The first sending policy is also referred to as a user initial status. Specifically, the first sending policy may include first values of an RI, an MCS, a PMI, and Pa. Pa may be an attenuation coefficient of the power amplifier corresponding to an antenna. In this embodiment of this application, the first value of Pa may be 0 db. In addition, a quantity of RBs occupied for sending the downlink data through a downlink channel corresponding to the first sending policy may be determined according to the first sending policy, and is referred to as a first value of an occupied RB. In addition, a quantity of remaining RBs may be calculated based on a quantity of available RBs and the quantity of occupied RBs. In a possible implementation, energy consumption corresponding to the transmit power of the antenna is equivalent to dynamic energy consumption of the base station, and the dynamic energy consumption is also related to the quantity of occupied RBs. It is assumed that first energy consumption includes first dynamic energy consumption, and the first dynamic energy consumption is positively correlated with the first value of Pa, and is positively correlated with the first value of the quantity of occupied RBs (referred to as the occupied RB for short). It is assumed that the first dynamic energy consumption=f (the first value of Pa and the first value of the occupied RB), where z=f (x, y) represents a determined increasing function, that is, z is positively correlated with x and y respectively.

After step S501, if the quantity of remaining RBs is greater than a threshold, where optionally, the threshold may be 0 or any quantity greater than 0, an attempt may be made to adjust the sending policy for the non-DMRS user whose MCS is greater than 9 in the one or more users, so that the MCS is less than or equal to 9 and the RI=1. Specifically, the following step S502 to step S514 may be sequentially performed on a user in the one or more users based on a specific sequence.

S502: Determine whether a current user is the non-DMRS user and the RI=1. If yes, step S503 is performed. If not, step S504 is performed.

The non-DMRS user may be a user in a TM 1/TM 2/TM 3/TM 4. The RI=1 means that the non-DMRS user can reduce Pa without affecting a code error rate.

S503: Update the MCS.

If the current user is the non-DMRS user, and the RI=1, the MCS may be updated. Specifically, an outer-loop adjustment amount may be added to a first value of the MCS.

S504: Determine whether the current user is the non-DMRS user. If not, step S505 is performed. If yes, step S506 is performed.

If the current user is a DMRS user (in other words, not the non-DMRS user), step S505 may be performed. If the current user is the non-DMRS user, the RI of the current user is greater than or equal to 2. In this case, step S506 may be performed.

S505: Use a next user as the current user, and return to perform step S502.

A first sending policy of the current user is used as the sending policy, and is not updated in the process A. If the current user is a last user, the process A ends.

S506: Change a rank to 1, and update a value of the MCS and a value of the PMI.

The RI may be changed to 1, and the PMI is updated based on a mapping table between an RI and a PMI. A larger MCS in codewords of a quantity corresponding to the original RI is selected as a basis, power conversion is increased, and the outer-loop adjustment amount is increased, to update the value of the MCS.

After step S503 or step S506, step S507 may be performed.

S507: Determine whether an updated MCS is greater than 9. If not, step S508 is performed. If yes, step S509 is performed.

S508: Use a next user as the current user, and return to perform step S502.

Updated values of the Rank, the MCS, and the PMI may be retained in a current policy, and optionally, the current policy may be marked as a sending policy in which Pa can be reduced. If the current user is a last user, the process A ends.

S509: Update the MCS to 9, and calculate Pa that can be reduced at a target code error rate.

Through calculation, a value of Pa that can be reduced is SINR (9)−SINR (the first value of the MCS). Pa=SINR (MCS) may be a correspondence between the MCS and a minimum Pa at the target code error rate. The value of Pa that can be reduced may meet the constraint condition 1 described above.

S510: Determine whether Pa that can be reduced is greater than −Pa_MAX. If not, step S511 is performed. If yes, step S512 is performed.

Pa_MAX may refer to an intermediate radio frequency reporting capability, for example, a maximum Pa value that can be reduced by the power amplifier corresponding to the antenna.

S511: Update Pa to −Pa_MAX.

If Pa that can be reduced is less than −Pa_MAX, because the first value of Pa is 0, the value of Pa may be updated to −Pa_MAX. In addition, when a TB measures the outer-loop adjustment amount, an acknowledge character (acknowledge character, ACK) may not be counted, and only a negative acknowledge character (Negative acknowledge character, NACK) is counted.

S512: Calculate the quantity of occupied RBs and the dynamic energy consumption based on MCS=9.

The quantity of RBs (that is, the quantity of occupied RBs) used based on the new MCS (that is, the index value of the MCS is 9) may be calculated, and the dynamic energy consumption is calculated based on an updated value of Pa and the quantity of occupied RBs.

S513: Determine whether the dynamic energy consumption is less than the first dynamic energy consumption. If not, step S505 is performed. If yes, step S514 is performed.

Optionally, a determining condition may further include whether the quantity of occupied RBs is less than or equal to the quantity of available RBs.

S514: Update a sending policy of the current user, use a next user as the current user, and return to perform step S502.

In other words, in the sending policy of the user, the RI=1, the MCS is less than or equal to 9, and Pa is Pa_MAX or SINR (9)−SINR (the first value of the MCS). The quantity of remaining RBs is updated, and if the quantity of remaining RBs is greater than the threshold, a next user is used as the current user, and the next user returns to perform step S502.

In steps S505, S508, and S514, if the current user is a last user, the process A ends.

If the quantity of remaining RBs is still greater than the threshold after the foregoing process A is performed on each user in the one or more users, optionally, the following process B may be performed on a user in the one or more users sequentially based on a specific sequence. In a possible implementation, if the one or more users include a plurality of users, the plurality of users may be sorted in descending order of index values of the MCS in a current sending policy. If index values of MCSs of two users are the same, an original default sequence may be maintained.

Process B: Attempt to adjust a sending policy for a DMRS user and/or a non-DMRS user whose MCS is less than or equal to 9.

Figure 6:
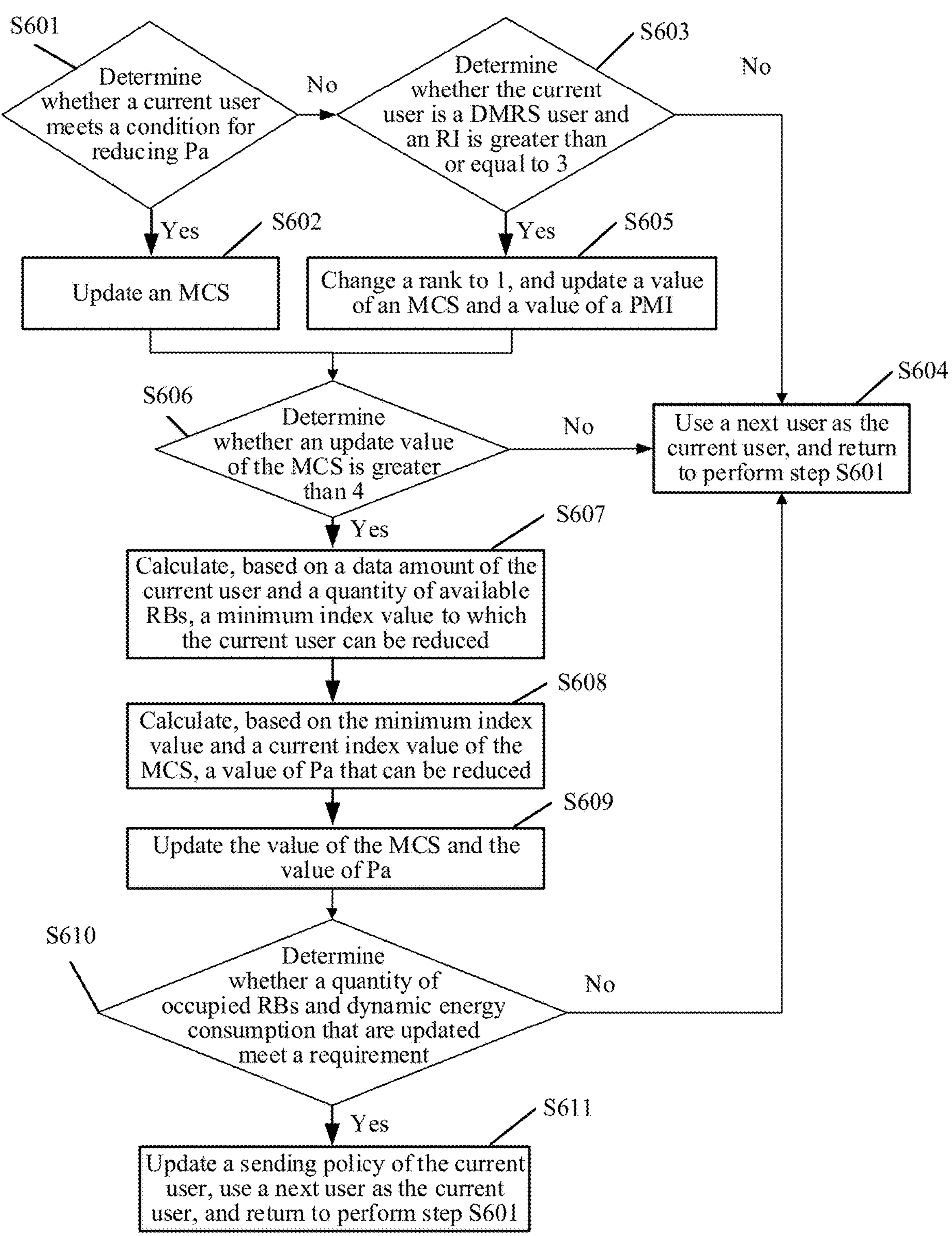

Specifically, refer to FIG. 6. Step S402 may further include step S601 to step S611.

S601: Determine whether a current user meets a condition for reducing Pa. If yes, step S602 is performed. If not, step S603 is performed.

A condition for reducing Pa may include that a transmission mode TM 9 or TM 10 is used, an RI is less than or equal to 2, and Pa is greater than −Pa_MAX; or a transmission mode TM 4 is used, the RI is equal to 1, and Pa is greater than or equal to −Pa_MAX.

S602: Update an MCS.

If the MCS is updated in a process of attempting to perform the process A on the current user, the MCS does not need to be updated. If the MCS is not updated in the process of attempting to perform the process A on the current user, an outer-loop adjustment amount may be increased for the MCS.

S603: Determine whether the current user is the DMRS user and the RI is greater than or equal to 3. If not, step S604 is performed. If yes, step S605 is performed.

Optionally, a determining condition may further include that Pa is greater than −Pa_MAX.

S604: Use a next user as the current user, and return to perform step S601.

An original sending policy of the current user is used as the sending policy. The original sending policy of the current user is a sending policy that is not updated in the process B. If the current user is a last user, the process B ends.

If the current user is a last user, the process B ends.

S605: Change a rank to 1, and update a value of the MCS and a value of a PMI.

The RI may be changed to 1, and the PMI is updated based on a mapping table between an RI and a PMI. A larger MCS in codewords of a quantity corresponding to the original RI is selected as a basis, power conversion is increased, and the outer-loop adjustment amount is increased, to update the value of the MCS.

After step S602 or step S605, step S606 may be performed.

S606: Determine whether an update value of the MCS is greater than 4. If not, step S604 is performed. If yes, step S607 is performed.

If a transmission mode of the current user is a TM 9 and there are two TBs, a minimum value of the MCS is selected to be in comparison with 4.

S607: Calculate, based on a data amount of the current user and a quantity of available RBs, a minimum index value to which the current user can be reduced.

The quantity of available RBs of the current user may be equal to a quantity of remaining RBs and a quantity of RBs occupied by the current user in a current sending policy. Optionally, if the minimum index value obtained through calculation is less than 5, the minimum index value of the MCS is set to 5.

S608: Calculate, based on the minimum index value and a current index value of the MCS, a value of Pa that can be reduced.

Still refer to Pa=SINR (MCS) in S509. A value of Pa that can be reduced (denoted as Pa_1) is equal to SINR (MCS_1)−SINR (MCS), where MCS_1 represents the minimum index value of the MCS obtained in S607, and MCS represents the current value of the MCS.

S609: Update the value of the MCS and the value of Pa.

The value of Pa may be updated to Pa_1+Pa, where Pa is a current value. The value of the MCS may be updated to the minimum index value obtained in S607.

Alternatively, optionally, if the value of Pa that can be reduced and that is obtained through calculation in S608 is less than −Pa_MAX−Pa, the value of Pa is updated to −Pa_MAX. Correspondingly, an updated value of the MCS is determined based on −Pa_MAX, Pa, and MCS.

S610: Determine whether a quantity of occupied RBs and dynamic energy consumption that are updated meet a requirement. If not, step S604 is performed. If yes, step S611 is performed.

The requirement may include that the quantity of occupied RBs and the dynamic energy consumption corresponding to the updated value of the MCS and the updated value of Pa are respectively less than the quantity of available RBs and dynamic energy consumption of the sending policy before updated.

A quantity of RBs used based on the new MCS may be calculated (for example, be estimated based on a resource block group RBG). The dynamic energy consumption is calculated by multiplying power consumption of each RB by the quantity of used RBs. If the dynamic energy consumption is less than the dynamic energy consumption of the sending policy before step S601, and the quantity of occupied RBs is less than or equal to the quantity of available RBs, step S604 may be performed. Otherwise, step S611 is performed.

S611: Update the sending policy of the current user, use a next user as the current user, and return to perform step S601.

The sending policy of the current user may be updated by using update values of parameters determined in the process B.

If the current user is a last user, the process B ends.

In the possible implementation 1, a user power spectral density may be changed at a TTI level by changing the rank and reducing to a quadrature phase shift keying (quadrature phase shift keying, QPSK) mode, to save energy.

In addition, it is proposed in this application that energy consumption of a base station may be reduced by reducing a quantity of channels, and the energy consumption may be understood as static energy consumption of the base station. It is proposed in this embodiment of this application that demodulation reliability is ensured by decreasing MCS1 when the quantity of channels is reduced, to reduce impact of a beam change on demodulation and measurement after some channels are deactivated.

2. Possible Implementation 2: The Transmission Parameter is the Quantity of Activated Antenna Columns.

Optionally, a base station may first determine the quantity of activated antenna columns or a quantity of deactivated antenna columns (denoted as c'), and then determine MCS1' based on c'. It is assumed that the quantity of deactivated antenna columns in an original sending policy is c.

Optionally, a maximum value of c' (referred to as a maximum quantity c_max of deactivated columns) may be first determined.

2.1: The Following Provides a Possible Method for Determining c_Max.

(1) Obtain a maximum RB extension coefficient corresponding to the quantity of deactivated columns on the premise that dynamic energy consumption does not exceed dynamic energy consumption under the original sending policy.

Dynamic power consumption of the antenna of the base station=a quantity of channels*a quantity of sent RBs. First, the dynamic energy consumption of the base station under the original sending policy may be calculated. It is assumed that the quantity c of deactivated columns is 0 under the original sending policy and a total quantity of RBs required by all to-be-scheduled users in a TM 9 is R (0). In this case, the dynamic energy consumption under the original sending policy=R (0)*c0, where c0 represents a quantity of antenna columns under the original sending policy. Therefore, on the premise that the dynamic energy consumption does not exceed the dynamic energy consumption under the original sending policy, R (c1')/R (0) is less than or equal to c0/(c0−c'). c0=7 is used as an example. A table 1 shows a mapping table of the maximum RB extension coefficient corresponding to the quantity of deactivated columns.

TABLE 1

| Quantity of deactivated columns | Maximum RB extension coefficient |
|---|---|
| 0 | 1 (namely, 32/32) |
| 1 | 1.142857143 (namely, 32/28) |
| 2 | 1.333333333 (namely, 32/24) |
| 3 | 1.6 (namely, 32/20) |
| 4 | 2 (namely, 32/16) |
| 5 | 2.666666667 (namely, 32/12) |
| 6 | 4 (namely, 32/8) |
| 7 | 8 (namely, 32/4) |

(2) Calculate a maximum RB extension coefficient corresponding to an available RB under the original sending policy.

Optionally, the maximum RB extension coefficient corresponding to the available RB=a quantity of available RBs/a quantity of original RBs. Still based on the example in step (1), the quantity of original RBs may be denoted as R (0). Therefore, the maximum RB extension coefficient corresponding to the available RB=the quantity of available RBs/R (0). It is assumed that the quantity of available RBs/R (0)=2.1.

A time sequence between step (1) and step (2) is not limited in this embodiment of this application.

(3) Determine a maximum quantity of deactivated columns by using the mapping table of the maximum RB extension coefficient corresponding to the quantity of deactivated columns.

Optionally, the mapping table of the maximum RB extension coefficient corresponding to the quantity of deactivated columns may be used to search a value of the quantity of deactivated columns in the mapping table when the maximum RB extension coefficient is less than or equal to the maximum RB extension coefficient corresponding to the available RB for the first time. A search sequence may be a sequence in which the quantity of deactivated columns gradually decreases.

For example, the mapping table of the maximum RB extension coefficient corresponding to the quantity of deactivated columns is shown in a table 2, and the maximum RB extension coefficient corresponding to the available RB is 2.1. The value of the quantity of deactivated columns is searched in the table 2 as 4 when the maximum RB extension coefficient is less than or equal to the maximum RB extension coefficient corresponding to the available RB for the first time.

After the maximum quantity of deactivated columns is obtained through step (1) to step (3) in 2.1, provided that c' is less than or equal to the maximum quantity c_max of deactivated columns, that the dynamic energy consumption after the antenna is deactivated does not exceed the dynamic energy consumption corresponding to the original sending policy can be ensured.

After some channels are deactivated, a beam changes, so that an SINR decreases. c0=7 is still used as an example. A table 2 shows an example of a mapping relationship between the quantity of deactivated columns and an SINR loss.

TABLE 2

| Quantity of deactivated columns | SINR loss dB |
|---|---|
| 0 | 0 |
| 1 | 1.16 |
| 2 | 2.50 |
| 3 | 4.08 |
| 4 | 6.02 |
| 5 | 8.52 |
| 6 | 12.04 |
| 7 | 18.06 |

Next, an MCS is reduced to find an optimal quantity c' (denoted as c_opt) of deactivated columns from a quantity of deactivated columns that is less than or equal to c_max. Optionally, conditions that MCS' and c_opt meet may include but are not limited to the following conditions.

Condition 1: MCS' of each user can compensate for an SINR loss corresponding to the quantity c' of deactivated columns.

Condition 2: An RB' determined based on the MCS' of each user and dynamic energy consumption corresponding to c_opt is less than or equal to the original RB and dynamic energy consumption corresponding to the original quantity of deactivated columns.

In addition, if a plurality of c's meet the foregoing condition 1 and condition 2, a largest c' may be selected as c_opt.

The following describes, with reference to step 2.2, a possible implementation of determining MCS' and c_opt.

2.2. Traverse from c_Max Down to Search the Optimal Quantity of Deactivated Columns.

(1) The MCSs are sorted in ascending order (If there are two codewords, a smaller MCS is selected). If the MCSs are the same, the MCSs are sorted in descending order.

(2) Calculate the optimal quantity c' of deactivated columns.

It is assumed that a current user is a first user. The optimal quantity c' of deactivated columns corresponding to the first user is searched downward from c_max.

(2.1) For the quantity c' of deactivated columns, calculate MCS' of each codeword of the first user that needs to be set to compensate for the SINR loss.

The SINR loss (denoted as P (c) dB) corresponding to c' may be determined by searching a mapping relationship (for example, a table 3) between the quantity of deactivated columns and the SINR loss. It is assumed that an MCS of a current codeword at the target TTI is Mb after the current codeword is adjusted by using baseline channel quality information (channel quality indication, CQI), a power spectral density after power control processing is reduced by Pd dB, and a CQI adjustment amount of power control corresponding to the current codeword is d, a calculation manner of a target value (MCS') of an MCS corresponding to a current quantity of deactivated columns is that MCS'=SINR to MCS (MCS to SINR (Mb+d)−Pd−P (c)). SINR to MCS and MCS to SINR represent conversion processing between an existing MCS and an existing SINR.

(2.2) Calculate a maximum quantity of RBs corresponding to the first user based on the maximum RB extension coefficient corresponding to the quantity c' of deactivated columns.

Optionally, the maximum quantity of RBs corresponding to the first user=B (1)*the maximum RB extension coefficient. B (1) may be a quantity of RBs required for sending first target data according to an original sending policy (that is, a first sending policy) of the first user, and the maximum RB extension coefficient may be a smaller value of the maximum RB extension coefficient corresponding to c' that is determined in the foregoing steps (1) and (2) in step 2.1.

(2.3) Determine, based on a to-be-scheduled data amount of a user (for example, a first target data amount of the first user), an RI, MCS' after the antenna is deactivated, and the maximum quantity of RBs, whether all data of the user can be completely sent. If data can be completely sent, a next step is performed. Otherwise, an attempt is made to deactivate a c−1 column.

In other words, for the first user, step (2.1) to step (2.3) are first performed by using c' as c_max. If it is determined in step (2.3) that sending cannot be completed, step (2.1) to step (2.4) are performed by using c' as c_max−1. The rest may be deduced by an analogy, until a quantity c' of deactivated columns that the first target data amount of the first user can be completely sent is found or is found to be 0.

(2.4) Calculate, according to (2.2) and (2.3) in the foregoing 2.2, a maximum quantity of RBs of the second user (referred to as a second user) and whether all data of the user can be completely sent. If there are only two users, the maximum quantity of RBs of the second user is: R (0)*a maximum extension coefficient (c')−the maximum quantity of RBs of the first user. The maximum extension coefficient (c') may be the maximum RB extension coefficient corresponding to c' determined in (1) in the foregoing step 2.1. If there are three users, the maximum quantity of RBs of the second user may be B (2)*the maximum RB extension coefficient (c'). B (2) may be a quantity of RBs required for sending second target data according to an original sending policy (that is, a second sending policy) of the second user, and the maximum RB extension coefficient may be a smaller value of the maximum RB extension coefficient corresponding to c' that is determined in the foregoing steps (1) and (2) in step 2.1.

If data can be completely sent, a next step is performed. Otherwise, an attempt is made to deactivate a first user computing of the c'-1 column.

(2.5) It is assumed that there are three users, if a quantity of deactivated columns that can activate data of the first two users to be completely sent is found, a maximum quantity of RBs of the third user (referred to as a third user) is calculated by the following formula: R (0)*the maximum extension coefficient (c')−the maximum quantity of RBs of the first user−the maximum quantity of RBs of the second user. The maximum extension coefficient (c') may be the maximum RB extension coefficient corresponding to c' determined in (1) in the foregoing step 2.1. If all data of the user can also be completely sent, the optimal quantity of deactivated columns (recorded as c_opt) is found. Otherwise, the antenna cannot be deactivated.

3. Possible Implementation 3: The Transmission Parameter is the Activated Polarization Direction of the Antenna.

It is assumed that a polarization direction is deactivated, and the following process may be sequentially performed on a user in the one or more users according to a specific sequence.

(3.1) For a current user, calculate channel state information CSI of antennas deactivated based on polarization.

For a user whose RI=1, a corresponding scheduled MCS=SINR to MCS (MCS to SINR (Mb+d)−Pd−P (c)−3). Meanings of the variables are the same meanings as those in the descriptions of channels deactivated based on a column. Details are not described herein again. "−3" means that 3 dB power is subtracted (which corresponds to 3 dB power loss after one polarization is deactivated). For a user whose RI=2, the user may be returned to RI=1. In this case, only one codeword is available, but an MCS of a codeword with a higher MCS is selected, and a first-class weight value corresponding to the codeword is stored. If the power loss cannot be compensated through calculation when the MCS is decreased to 0, polarization cannot be deactivated.

(3.2) Determine whether all data of the user can be completely sent based on an amount of to-be-scheduled data for the current user, an RI after the polarization is deactivated, the MCS after the polarization is deactivated, and RB_Max. If all the data of the user can be completely sent, a next user returns to perform step (3.1). Otherwise, the polarization direction cannot be deactivated.

RB_Max=a quantity of RBs occupied by a user*MIN (a total quantity of available RBs/R (0), 2), where R (0) is a total estimated quantity of RBs for all users in a TM 9 whose antennas are not deactivated based on the polarization. A value of R (0) can be rounded down by RBG.

In the possible implementation 2 and the possible implementation 3, PDSCH channels of the user in the TM 9 are deactivated based on the polarization at the TTI level, to help save energy.

It can be learned that in this embodiment of this application, a quantity of flows and a quantity of channels are reduced in space domain (antennas are deactivated based on the column and polarization), and a user power spectral density is reduced in power domain, so that a service change is responded in time, and measurement and demodulation are not affected. Therefore, effect of energy saving can be achieved without affecting a user-perceived rate.

The foregoing describes the method in embodiments of this application, and the following describes an apparatus in embodiments of this application.

Figure 7:
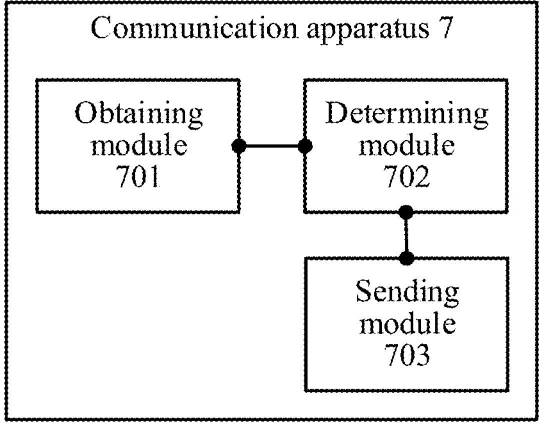
FIG. 7 and FIG. 8 each show an example of a possible structure of a communication apparatus according to an embodiment of this application.

FIG. 7 is a schematic diagram of a structure of a communication apparatus. The communication apparatus 7 is configured to implement a function of the wireless access device described in embodiments of this application. As shown in FIG. 7, the communication apparatus 7 may include an obtaining module 701, a determining module 702, and a sending module 703. The obtaining module 701 may be configured to perform step S401. The determining module 702 may be configured to perform step S402, the process A shown in FIG. 5, or the process B shown in FIG. 6. The sending module 703 is configured to perform step S403.

In a possible implementation, the obtaining module 701 and the sending module 703 of the communication apparatus 7 may be integrated into a transceiver module or a communication module.

Division into modules in this embodiment of this application is an example, is merely logical function division, and there may be another division manner during actual implementation. In addition, functional modules in embodiments of this application may be integrated into one processor, or each of the modules may exist alone physically, or two or more modules are integrated into one module. The integrated module may be implemented in a form of hardware, or may be implemented in a form of a software functional module.

Figure 8:
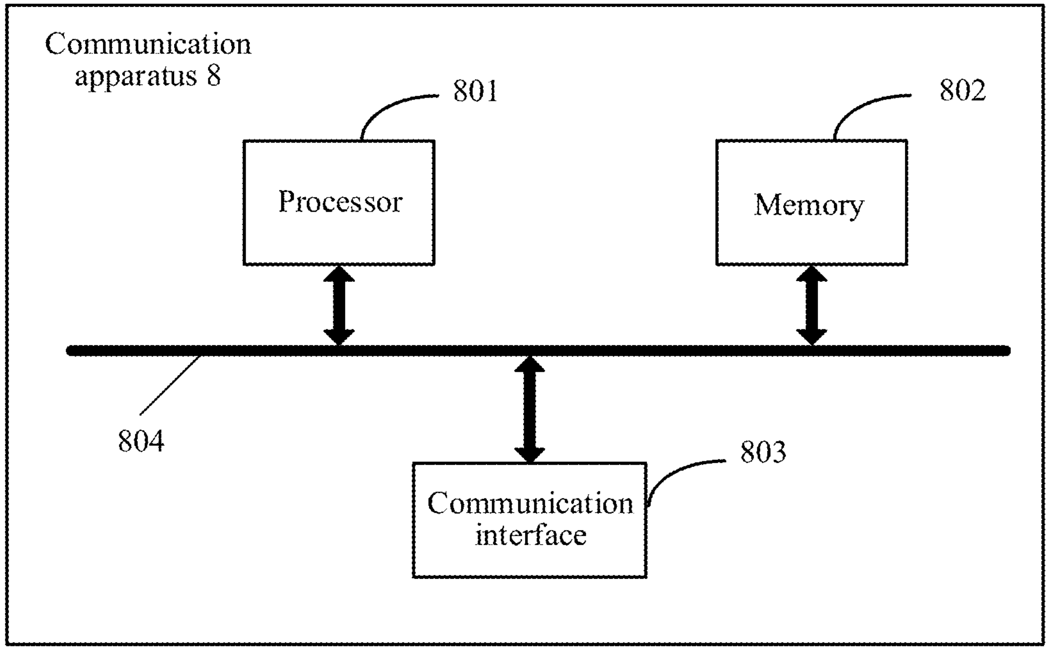

FIG. 8 shows a communication apparatus 8 according to an embodiment of this application, to implement a function of the wireless access device in the foregoing method. The apparatus may be a base station, or may be an apparatus that can be used in a matching with the base station. For example, the communication apparatus 8 may be a chip system. In embodiments of this application, the chip system may include a chip, or may include a chip and another discrete component. The communication apparatus 8 may include at least one processor 801, configured to implement the function of the wireless access device in the method provided in embodiments of this application.

The communication apparatus 8 may further include at least one memory 802, configured to store program instructions and/or data. The memory 802 is coupled to the processor 801. The processor 801 may operate in cooperation with the memory 802. The processor 801 may execute the program instructions stored in the memory 802. One or more memories in the at least one memory may be included in the processor.

The communication apparatus 8 may further include a communication interface 803, configured to communicate with another device through a transmission medium, so that the communication apparatus 8 can communicate with another device. For example, the communication interface 803 may be a transceiver, a circuit, a bus, a module, a pin, or another type of communication interface, and the another device may be a network device. The processor 801 receives and sends data through the communication interface. For details, refer to the detailed descriptions in the method example. Details are not described herein again.

A specific connection medium among the communication interface 803, the processor 801, and the memory 802 is not limited in this embodiment of this application. In this embodiment of this application, the memory 802, the processor 801, and the communication interface 803 are connected through a bus 804 in FIG. 8. In FIG. 8, the bus is indicated by using a bold line. A manner of connection between other components is merely an example for description, and imposes no limitation. The bus may be classified into an address bus, a data bus, a control bus, and the like. For ease of representation, only one bold line is for representing the bus in FIG. 8.

However, it does not mean that there is only one bus or only one type of bus.

In this embodiment of this application, the processor may be a general-purpose processor, a digital signal processor, an application-specific integrated circuit, a field programmable gate array or another programmable logic device, a discrete gate or transistor logic device, or a discrete hardware component. The processor can implement or execute the methods, steps, and logical block diagrams disclosed in embodiments of this application. The general-purpose processor may be a microprocessor, any conventional processor, or the like. The steps of the method disclosed with reference to embodiments of this application may be directly performed by a hardware processor, or may be performed through a combination of hardware of a processor and a software module.

In this embodiment of this application, the memory may be a non-volatile memory such as a hard disk drive (hard disk drive, HDD) or a solid-state drive (solid-state drive, SSD), or may be a volatile memory (volatile memory) such as a random-access memory (random-access memory, RAM). The memory is any other medium that can be for carrying or storing expected program code in a form of instructions or a data structure and that can be accessed by a computer, but is not limited thereto. The memory in this embodiment of this application may alternatively be a circuit or any other apparatus that can implement a storage function, and is configured to store program instructions and/or data.

All or a part of the technical solutions provided by embodiments of this application may be implemented by using software, hardware, firmware, or any combination thereof. When software is used to implement embodiments, all or a part of embodiments may be implemented in a form of a computer program product. The computer program product includes one or more computer instructions. When the computer program instructions are loaded and executed on a computer, all or a part of the procedures or functions according to embodiments of the present disclosure are generated. The computer may be a general-purpose computer, a dedicated computer, a computer network, a network device, a terminal device or another programmable apparatus. The computer instructions may be stored in a computer-readable storage medium or may be transmitted from a computer-readable storage medium to another computer-readable storage medium. For example, the computer instructions may be transmitted from a website, a computer, a server, or a data center to another website, another computer, another server, or another data center in a wired (for example, a coaxial cable, an optical fiber, or a digital subscriber line (DSL)) or wireless (for example, infrared, radio, microwave, or the like) manner. The computer-readable storage medium may be any usable medium accessible by the computer, or a data storage device, for example, a server or a data center, integrating one or more usable media. The usable medium may be a magnetic medium (for example, a floppy disk, a hard disk drive, or a magnetic tape), an optical medium (for example, a digital video disc (digital video disc, DVD)), a semiconductor medium, or the like.

In embodiments of this application, on the premise that there is no logical conflict, embodiments may be mutually referenced. For example, methods and/or terms in the method embodiment may be mutually referenced. For example, functions and/or terms in the apparatus embodiments may be mutually referenced. For example, functions and/or terms in the apparatus embodiments and the method embodiment may be mutually referenced.

In embodiments of this application, "the at least one" may be described as one or more, and "a plurality of" may be two, three, four, or more. This is not limited in this application.

In embodiments of this application, "/" may represent an "or" relationship between associated objects. For example, A/B may represent A or B. "and/or" may be for describing three relationships between associated objects. For example, A and/or B may represent the following three cases: Only A exists, both A and B exist, and only B exists, where A and B may be singular or plural. For ease of describing the technical solutions in embodiments of this application, in embodiments of this application, words such as "first" and "second" may be for distinguishing technical features with a same or similar function. In descriptions of this application, terms such as "first" and "second" do not limit a quantity and an execution sequence, and the terms such as "first" and "second" do not indicate a definite difference. In embodiments of this application, the word "example" or "for example" is for representing an example, an illustration, or a description. Any embodiment or design solution described as "example" or "for example" should not be explained as being more preferred or having more advantages than another embodiment or design solution. A word such as "example" or "for example" is for presenting a related concept in a specific manner for ease of understanding.

Obviously, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A method performed by a wireless access device or a chip system of the wireless access device, the method comprising:

obtaining downlink data to be sent at a target transmission time interval (TTI), wherein the downlink data comprises target data to be sent to each user in one or more users in a cell;

determining one or more second sending policies of the one or more users at the target TTI based on data amount of the one or more users and one or more first sending policies of the one or more users, wherein the one or more first sending policies and the one or more second sending policies are separately used for controlling a downlink channel parameter, and the one or more second sending policies comprise a second sending policy of a first user in the one or more users is different from a first sending policy of the first user; and second energy consumption for sending the downlink data based on the one or more second sending policies is less than first energy consumption for sending the downlink data based on the one or more first sending policies, and a second time-frequency resource for sending the downlink data based the one or more second sending policies is greater than a first time-frequency resource for sending the downlink data based the one or more first sending policies and is less than an available time-frequency resource provided by an antenna of the wireless access device at the target TTI; and sending the downlink data at the target TTI according to the one or more second sending policies of the one or more users.

2. The method of claim 1, wherein a second index value of a modulation and coding scheme (MCS) indicated by the second sending policy of the first user is less than a first index value of an MCS indicated by the first sending policy of the first user.

3. The method of claim 2, wherein a second value that is of a transmission parameter of the antenna and that is indicated by the second sending policy of the first user is less than a first value that is of the transmission parameter and that is indicated by the first sending policy of the first user, wherein a value of the transmission parameter is positively correlated with energy consumption corresponding to the antenna.

4. The method of claim 3, wherein the transmission parameter is for determining a transmit power of the antenna or a quantity of activated antennas in the antenna.

5. The method of claim 4, wherein the transmission parameter comprises an antenna activating parameter for determining the quantity of activated antennas in the antenna, wherein the antenna activating parameter comprises a quantity of activated antenna columns, or an activated polarization direction of the antenna.

6. The method of claim 3, wherein a difference between channel quality corresponding to the second value and channel quality corresponding to the first value is less than or equal to a difference between second minimum channel quality corresponding to the second index value and first minimum channel quality corresponding to the first index value, wherein the second minimum channel quality is minimum channel quality required for sending target data of the first user based on the second index value on the premise of ensuring a target code error rate, and the first minimum channel quality is minimum channel quality required for sending the target data of the first user based on the first index value on the premise of ensuring the target code error rate.

7. The method of claim 3, wherein the second index value is determined based on the available time-frequency resource.

8. The method of claim 3, wherein if a second value of the power is less than a first value of the power, the target user is a non-demodulation reference signal user, and the first index value is greater than 9, the second index value is less than or equal to 9.

9. An apparatus comprising:

at least one processor; and one or more memories storing computer instructions that, when executed by the at least one processor, cause the apparatus to perform operations comprising:

obtaining downlink data to be sent at a target transmission time interval (TTI), wherein the downlink data comprises target data to be sent to each user in one or more users in a cell;

determining one or more second sending policies of the one or more users at the target TTI based on data amount of the one or more users and one or more first sending policies of the one or more users, wherein the one or more first sending policies and the one or more second sending policies are separately used for controlling a downlink channel parameter, and the one or more second sending policies comprise a second sending policy of a first user in the one or more users is different from a first sending policy of the first user; and second energy consumption for sending the downlink data based on the one or more second sending policies is less than first energy consumption for sending the downlink data based on the one or more first sending policies, and a second time-frequency resource for sending the downlink data based the one or more second sending policies is greater than a first time-frequency resource for sending the downlink data based the one or more first sending policies and is less than an available time-frequency resource provided by an antenna at the target TTI; and sending the downlink data at the target TTI according to the one or more second sending policies of the one or more users.

10. The apparatus of claim 9, wherein a second index value of a modulation and coding scheme (MCS) indicated by the second sending policy of the first user is less than a first index value of an MCS indicated by the first sending policy of the first user.

11. The apparatus of claim 10, wherein a second value that is of a transmission parameter of the antenna and that is indicated by the second sending policy of the first user is less than a first value that is of the transmission parameter and that is indicated by the first sending policy of the first user, wherein a value of the transmission parameter is positively correlated with energy consumption corresponding to the antenna.

12. The apparatus of claim 11, wherein the transmission parameter is for determining a transmit power of the antenna or a quantity of activated antennas in the antenna.

13. The apparatus of claim 12, wherein the transmission parameter comprises an antenna activating parameter for determining the quantity of activated antennas in the antenna, wherein the antenna activating parameter comprises a quantity of activated antenna columns, or an activated polarization direction of the antenna.

14. The apparatus of claim 11, wherein a difference between channel quality corresponding to the second value and channel quality corresponding to the first value is less than or equal to a difference between second minimum channel quality corresponding to the second index value and first minimum channel quality corresponding to the first index value, wherein the second minimum channel quality is minimum channel quality required for sending target data of the first user based on the second index value on the premise of ensuring a target code error rate, and the first minimum channel quality is minimum channel quality required for sending the target data of the first user based on the first index value on the premise of ensuring the target code error rate.

15. The apparatus of claim 11, wherein the second index value is determined based on the available time-frequency resource.

16. The apparatus of claim 11, wherein if a second value of the power is less than a first value of the power, the target user is a non-demodulation reference signal user, and the first index value is greater than 9, the second index value is less than or equal to 9.

17. A non-transitory computer-readable storage medium, comprising program instructions that, when run on a computer, cause the computer to perform the method comprising:

obtaining downlink data to be sent at a target transmission time interval (TTI), wherein the downlink data comprises target data to be sent to each user in one or more users in a cell;

determining one or more second sending policies of the one or more users at the target TTI based on data amount of the one or more users and one or more first sending policies of the one or more users, wherein the one or more first sending policies and the one or more second sending policies are separately used for controlling a downlink channel parameter, and the one or more second sending policies comprise a second sending policy of a first user in the one or more users is different from a first sending policy of the first user; and second energy consumption for sending the downlink data based on the one or more second sending policies is less than first energy consumption for sending the downlink data based on the one or more first sending policies, and a second time-frequency resource for sending the downlink data based on the one or more second sending policies is greater than a first time-frequency resource for sending the downlink data based on the one or more first sending policies and is less than an available time-frequency resource provided by an antenna at the target TTI; and sending the downlink data at the target TTI according to the one or more second sending policies of the one or more users.

* * * * *